United States Patent

Szymkowicz

(10) Patent No.: US 6,915,629 B2
(45) Date of Patent: Jul. 12, 2005

(54) AFTER-TREATMENT SYSTEM AND METHOD FOR REDUCING EMISSIONS IN DIESEL ENGINE EXHAUST

(75) Inventor: Patrick G. Szymkowicz, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/093,182

(22) Filed: Mar. 7, 2002

(65) Prior Publication Data

US 2003/0167756 A1 Sep. 11, 2003

(51) Int. Cl.[7] .................................................. F01N 3/00
(52) U.S. Cl. ............................ 60/289; 60/274; 60/286; 60/295; 60/301; 60/303; 60/311
(58) Field of Search .................. 60/274, 289, 286, 60/301, 311, 285, 295, 297, 300, 303

(56) References Cited

U.S. PATENT DOCUMENTS

| | | | | |
|---|---|---|---|---|
| 3,896,616 A | * | 7/1975 | Keith et al. ...................... | 60/274 |
| 5,152,137 A | * | 10/1992 | Nishizawa ..................... | 60/276 |
| 5,235,956 A | * | 8/1993 | Yoshizaki ..................... | 123/585 |
| 5,433,074 A | * | 7/1995 | Seto et al. ..................... | 60/301 |
| 5,560,202 A | * | 10/1996 | Hosoya et al. ................. | 60/284 |
| 5,577,383 A | * | 11/1996 | Kuroda et al. ................. | 60/274 |
| 5,706,653 A | * | 1/1998 | Shoji et al. .................... | 408/30 |
| 5,765,368 A | * | 6/1998 | Matsumoto et al. ........... | 60/274 |
| 5,867,982 A | * | 2/1999 | Tengblad et al. ............. | 123/585 |
| 5,974,791 A | * | 11/1999 | Hirota et al. ................... | 60/276 |
| 6,122,909 A | * | 9/2000 | Murphy et al. ............... | 60/286 |
| 6,192,676 B1 | * | 2/2001 | Zurbig et al. .................. | 60/286 |
| 6,260,353 B1 | * | 7/2001 | Takahashi ..................... | 60/284 |
| 6,354,078 B1 | * | 3/2002 | Karlsson et al. .............. | 60/274 |
| 6,367,246 B1 | * | 4/2002 | Hirota et al. ................. | 60/274 |

FOREIGN PATENT DOCUMENTS

JP          2001-073748      *   3/2001

* cited by examiner

*Primary Examiner*—Thomas Denion
*Assistant Examiner*—Diem Tran
(74) *Attorney, Agent, or Firm*—Kathryn A. Marra

(57) ABSTRACT

An after-treatment system arrangement and method of operating the after-treatment system arrangement is provided for heating the exhaust gas of an internal combustion engine. The after-treatment system arrangement includes an oxidation device for catalytically oxidizing the exhaust gas and a port in the exhaust-gas stream for selectively introducing a controlled amount of oxygen into the exhaust gas in response to a condition of the exhaust gas. The introduction of oxygen can be selectively controlled in response to the temperature of the exhaust gas downstream of the oxidation device. Simultaneously or alternatively, the introduction of oxygen can be selectively controlled in response to the chemical composition of the exhaust gas. The air-to-fuel ratio of the exhaust gas may also be controlled to further facilitate heating of the exhaust gas. The after-treatment system arrangement can also be controlled to remove pollutant emissions from the exhaust gas.

29 Claims, 1 Drawing Sheet

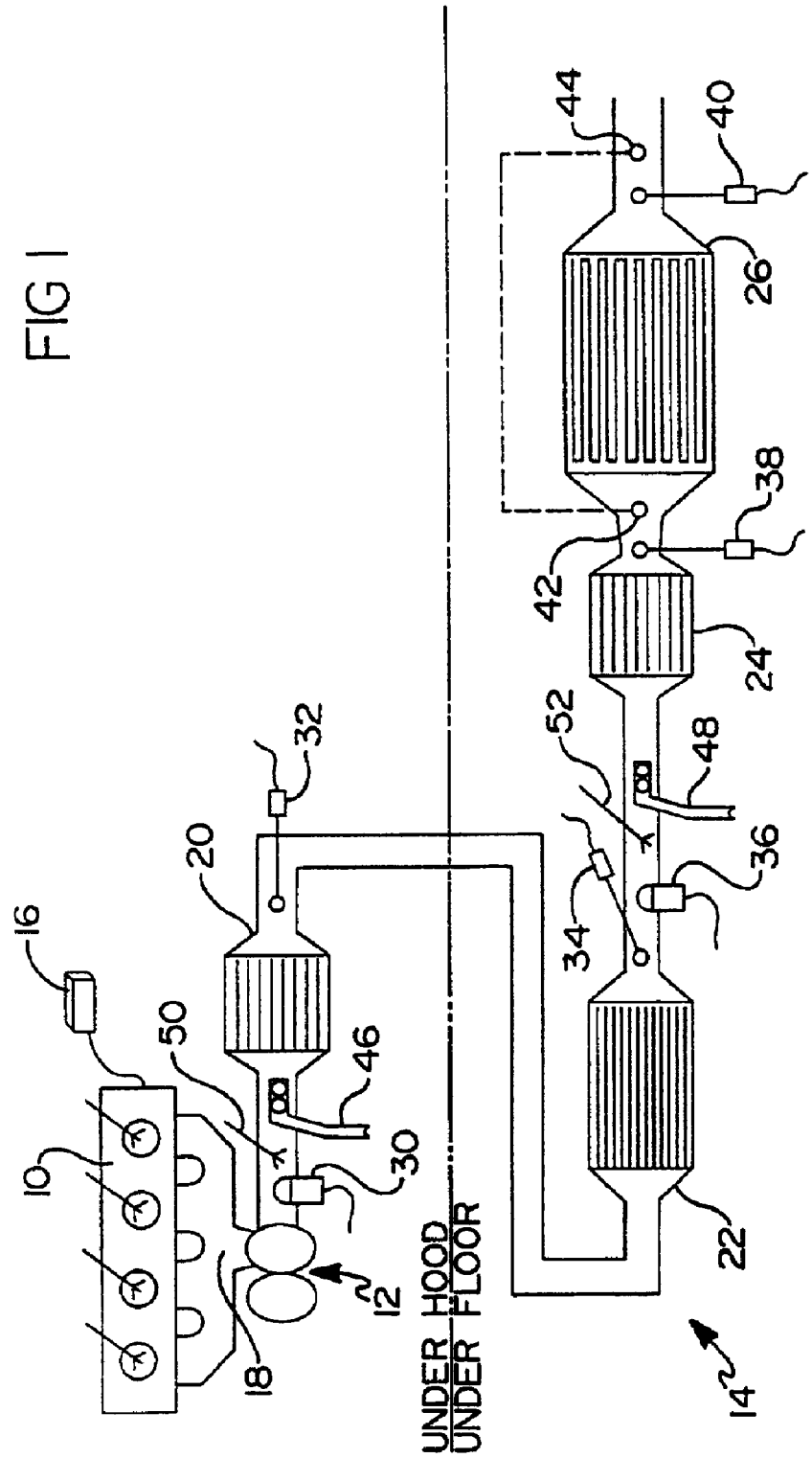

AFTER-TREATMENT SYSTEM AND METHOD FOR REDUCING EMISSIONS IN DIESEL ENGINE EXHAUST

FIELD OF THE INVENTION

The present invention relates generally to after-treatment systems for removing undesirable pollutant emissions from the exhaust gas of an internal combustion engine. More particularly, the present invention relates to a method and arrangement for heating the exhaust gas of a diesel engine to facilitate operation of the after-treatment system.

BACKGROUND OF THE INVENTION

Manufacturers of vehicles that employ internal combustion engines, more particularly diesel engines, are under increased pressure to comply with current and future emission standards for the release of nitrogen oxides ($NO_X$), particularly nitrogen monoxide (NO), as well as unburned and partially oxidized hydrocarbons (HC), carbon monoxide (CO), particulate matter (PM), and other pollutants, such as hydrogen sulfide ($H_2S$) and ammonia ($NH_3$). In order to reduce the pollutant emissions of a diesel engine, the latter are typically operated with an exhaust gas after-treatment system through which the exhaust gas from the diesel engine flows.

Exhaust gas after-treatment systems typically include one or more after-treatment devices, such as oxidation catalysts, $NO_X$ abatement devices, particulate filters and sulfur traps. These after-treatment devices generally require certain conditions to exist in the engine exhaust gas in order to perform optimally. More specifically, $NO_X$ abatement devices and oxidation catalysts, for example, have a relatively narrow temperature window within which the devices are activated, regenerated or operate with high conversion efficiency. Periodically, after-treatment devices require heating beyond that provided by the exhaust gas to achieve the desired operating temperature.

Another condition that is typically required in an exhaust gas after-treatment system is the presence of sufficient oxygen to facilitate oxidation of pollutant emissions. Additionally, diesel particulate filters periodically require a relatively high concentration of oxygen in the exhaust gas to facilitate regeneration of the particulate filter.

Prior to the present invention, the required exhaust gas conditions could not always be achieved during normal operation of the engine. More particularly, the exhaust gas temperature could only be influenced to a certain degree by the combustion process without the use of a source of supplemental heat, such as an electric heater in the exhaust-gas stream. Also, during certain engine operating conditions, it was difficult to generate the needed high levels of oxygen in the exhaust gas required by the oxidation catalysts and particulate filters.

SUMMARY OF THE INVENTION

An after-treatment system arrangement and method is provided for heating the exhaust gas of an internal combustion engine to a temperature range that facilitates efficient operation of after-treatment devices, such as oxygen catalysts and $NO_X$ abatement devices. The after-treatment system arrangement is also suited to facilitate oxidation of pollutant emissions in the exhaust gas of an internal combustion engine.

In a first embodiment of the present invention, a method and arrangement for heating the exhaust gas is described. The after-treatment system arrangement includes an oxidation device for catalytically oxidizing the exhaust gas and a port in the exhaust-gas stream for selectively introducing a controlled amount of oxygen into the exhaust gas in response to a condition of the exhaust gas. The temperature of the exhaust gas is increased due to an exothermic reaction in the oxidation catalyst, which is precisely controlled by the selective introduction of oxygen into the exhaust gas prior to oxidation. The introduction of oxygen can be selectively controlled in response to the temperature of the exhaust gas downstream of the oxidation device. Simultaneously or alternatively, the introduction of oxygen can be selectively controlled in response to the chemical composition of the exhaust gas. The air-to-fuel ratio of the exhaust gas prior to oxidation may also be selectively controlled to further facilitate heating of the exhaust gas.

In a second embodiment of the present invention, a method and arrangement for removing pollutant emissions from the exhaust gas is described. In this embodiment, the after-treatment system arrangement is substantially similar to the arrangement described in the preferred embodiment. The oxidation of pollutant emissions in the oxidation device is facilitated by the controlled introduction of oxygen into the exhaust gas upstream of the oxidation device. The introduction of oxygen can be selectively controlled in response to the temperature of the exhaust gas downstream of the oxidation device. Simultaneously or alternatively, the introduction of oxygen can be selectively controlled in response to the chemical composition of the exhaust gas.

The present invention facilitates the reduction of pollutant emissions, such as CO, HC, $NO_X$, PM, $H_2S$ and $NH_3$, in the exhaust of an internal combustion engine by providing the required temperatures and exhaust gas chemistry needed to operate after-treatment devices. Among other advantages, the present invention facilitates a rapid increase in temperature of the exhaust gas following cold engine start conditions and during low ambient temperature operating conditions. Another advantage is that the present invention facilitates a rapid increase in the temperature of oxidation and $NO_X$ abatement devices to a temperature range that supports oxidation of the exhaust gas and adsorption of nitrogen oxides and oxides of sulfur. Yet another advantage is that the present invention facilitates a rapid increase in the temperature of a $NO_X$ adsorber catalyst to a temperature that supports reduction of adsorbed nitrogen oxides and oxides of sulfur. Still another advantage is that the present invention facilitates a rapid increase in the temperature of a particulate filter to a temperature range that supports the rapid combustion of collected particulate matter. Still another advantage is that the present invention facilitates removal of undesirable pollutant emissions from the exhaust gas by providing sufficient oxygen in the exhaust gas for oxidation of the pollutant emissions.

Various additional aspects and advantages of this invention will become apparent to those skilled in the art from the following detailed description of the preferred embodiment, when read in light of the accompanying drawings.

BRIEF DESCRIPTION OF THE DRAWING

FIG. 1 is a schematic illustration of an exemplary after-treatment system suitable for employing the features of the present invention.

DESCRIPTION OF THE PREFERRED EMBODIMENTS

Referring now to the drawings, the preferred embodiments of the present invention are described in detail. FIG.

1 shows a schematic arrangement of an internal combustion engine 10 with an exhaust-gas turbocharger 12, an exhaust gas after-treatment system 14 and an electronic control unit (ECU) 16. As illustrated in FIG. 1, the exhaust gas formed during combustion is collected in an exhaust gas collecting chamber 18 downstream of the engine 10 and is partly fed into the turbine inlet side of the exhaust-gas turbocharger 12. After flowing through the turbine of the exhaust-gas turbocharger 12, the exhaust gas is fed to the exhaust gas after-treatment system 14. As will be explained in further detail below, the after-treatment system configuration of FIG. 1 is given by way of example only, and is not intended to limit the scope of this invention.

The exemplary exhaust gas after-treatment system 14 effectively combines the functions of a first oxidation device 20, a $NO_X$ abatement device 22 that is connected downstream of device 20, a second oxidation device 24 that is connected downstream of device 22, and a particulate filter 26 that is connected downstream of device 24. The after-treatment system 14 thus comprises a number of partial elements 20, 22, 24 and 26, within which different chemical reactions proceed for the reduction of exhaust gas emissions, such as $NO_X$ (nitrogen oxides) and PM (particulate matter).

The after-treatment system 14 is particularly adapted, but not necessarily limited, to receive exhaust gas discharged from a diesel engine. Typically, the exhaust gas from a diesel engine contains various nitrogen oxides ($NO_X$), particularly nitrogen monoxide (NO), as well as unburned and partially oxidized hydrocarbons (HC), carbon monoxide (CO), and particulate matter (PM). Other pollutants can be formed in the different chemical reactions that proceed in after-treatment system 14, such as hydrogen sulfide ($H_2S$) and ammonia ($NH_3$).

A first stage of after-treatment system 14 includes oxidation device 20, which may function as an oxidation catalyst or three-way catalyst, as is known in the art. Oxidation device 20 will oxidize reactants, such as $H_2$, HC and CO, present in the exhaust gas through an exothermic or heat-energy releasing reaction that proceeds in oxidation device 20, provided a particular activation temperature is achieved for oxidation. The exothermic reaction that proceeds in oxidation device 20 raises the temperature of the exhaust gas exiting oxidation device 20 and converts the $H_2$, HC and CO into more desirable molecules, such as carbon dioxide ($CO_2$) and water ($H_2O$). Therefore, the ability to rapidly activate and sustain the temperature of oxidation device 20 is essential to raise the temperature of downstream after-treatment devices and to oxidize harmful pollutant emissions.

The activation temperature for oxidation devices, such as oxidation catalysts and three-way catalysts, varies depending on the type and amount of reactants in the exhaust gas and the flow rate of reactants through the oxidation device. In general, $H_2$ will oxidize at lower temperatures than CO, which will oxidize at lower temperatures than hydrocarbons (HC), such as raw diesel fuel. Additionally, HC molecular structure can vary, and with that, the activation temperature for HC oxidation. Pollutants such as $NH_3$ and $H_2S$ also have specific activation temperatures. Finally, the activation temperature for various reactants (e.g., $H_2$, CO, HC, $NH_3$ and $H_2S$) can vary with the precious metals (e.g., Pt, Pd and Rh) and wash coat technology employed in the oxidation device.

During normal operation, diesel engine exhaust typically includes very small quantities of $H_2$, HC and CO and cannot provide a measurable exothermic reaction in oxidation device 20. Thus, additional fuel must be provided in the exhaust to generate a useful exothermic reaction. Generally, CO is the best fuel for this purpose because it oxidizes cleanly to $CO_2$, oxidizes at relatively low temperatures and releases large amounts of energy. $H_2$ oxidizes cleanly to $H_2O$ at relatively low temperatures, but does not release a significant amount of energy. HC is even less desirable because it is difficult to cleanly oxidize to $H_2O$ and $CO_2$ (some HC usually remains) and generally requires a high catalyst temperature to support oxidation.

A second stage of after-treatment system 14 includes $NO_X$ abatement device 22. $NO_X$ abatement devices that may be utilized in after-treatment system 14 include, but are not limited to, $NO_X$ adsorber catalysts, $NO_X$ catalysts, $NO_X$ catalysts employing selective catalytic reduction with urea or ammonia, and $NO_X$ catalysts assisted by non-thermal plasmas. For illustration, and by way of example only, $NO_X$ abatement device 22 will be described as comprising a $NO_X$ adsorber catalyst.

In $NO_X$ adsorber catalysts, the respective efficiencies for $NO_X$ adsorption, the decomposition of stored nitrates and the reduction of $NO_X$ to $N_2$, vary with temperature. Under lean exhaust air-fuel conditions, i.e., when the air-to-fuel ratio of the exhaust gas is lean in fuel, $NO_X$ abatement device 22 adsorbs oxides of nitrogen and oxides of sulfur contained in the exhaust gas to form nitrates and sulfates. Eventually the nitrates and sulfates saturate $NO_X$ abatement device 22 requiring removal through a regeneration process. Regeneration requires the presence of reductants, such as CO and other species like $H_2$ and HC, and a very low concentration of oxygen in the exhaust gas. The reductants may be introduced into the exhaust-gas stream, for example, by periodically operating the engine under rich air-fuel conditions, i.e., when the air-to-fuel ratio of the air-fuel mixture in the combustion chambers is rich in fuel, by selectively injecting a controlled amount of hydrocarbon fuel into the exhaust-gas stream, by selectively injecting a reducing agent(s), such as CO and $H_2$, into the exhaust-gas stream, or by any combination of the above. The oxygen may be removed from the exhaust gas by rich air-fuel combustion in engine 10 or by chemical oxidation reactions in after-treatment system 14 upstream of $NO_X$ abatement device 22.

In the exemplary after-treatment system 14, when $NO_X$ abatement device 22 is above approximately 200° C. and the exhaust gas is rich in fuel, the reductants in the exhaust-gas stream, such as CO and HC, decompose the nitrates stored in $NO_X$ abatement device 22 to form nitrogen oxides. The nitrogen oxides react with additional reductants in the exhaust-gas stream in the presence of precious metals, such as platinum and rhodium, to form $N_2$, $H_2O$, $CO_2$ and possibly $NH_3$ in a process commonly referred to as $NO_X$ reduction. Similarly, when $NO_X$ abatement device 22 is above approximately 600° C., the reductants in the exhaust gas will decompose the sulfates stored in $NO_X$ abatement device 22 to form oxides of sulfur and possibly $H_2S$ in a process commonly referred to as sulfur release.

A third stage of the after-treatment system 14 includes second oxidation device 24. As described above, engine 10 can be operated in a manner that generates high concentrations of reductants, such as $H_2$, HC and CO. During periods of rich engine operation, there is generally a very low concentration of oxygen in the exhaust gas. During a typical $NO_X$ absorber catalyst nitrate regeneration cycle, a significant amount of reductants, including, but not limited to, CO, HC and $NH_3$, will be emitted from $NO_X$ abatement device 22. During a typical $NO_X$ absorber catalyst sulfate regeneration cycle, $H_2S$ also accompanies the CO and HC emitted from the $NO_X$ abatement device 22. Upon achieving an activation temperature, second oxidation device 24 can be used oxidize the CO, HC, $NH_3$ and $H_2S$ exiting $NO_X$ abatement device 22, provided there is sufficient oxygen in the exhaust gas.

A fourth stage of the after-treatment system 14 includes particulate filter 26. During engine operation, particulate matter, such as soot (carbonaceous matter), HC molecules on the surface of the soot, ash or other non-carbon material, and sulfate particles in the exhaust gas, is collected by the porous walls of particulate filter 26. Over time the particulate matter gradually accumulates in particulate filter 26 resulting in an increase in the pressure drop through particulate filter 26, a corresponding reduction in engine output and an increase in engine fuel consumption due to an increase in exhaust back pressure. To overcome this accumulation problem, particulate filter 26 is periodically regenerated. During the regenerating process, the particulate matter collected in particulate filter 26 is burned and removed from particulate filter 26, as will also be described in further detail below.

In order to monitor the conditions of the exhaust gas, after-treatment system 14 preferably employs various sensors positioned in the exhaust-gas stream. A first $NO_X$ sensor 30 and a first temperature sensor 32 are preferably arranged in the exhaust-gas stream upstream and downstream of first oxidation device 20, respectively. A second temperature sensor 34 and a second $NO_X$ sensor 36 are arranged in the exhaust-gas stream downstream of $NO_X$ abatement device 22. A third and fourth temperature sensor 38 and 40, respectively, are arranged in the exhaust-gas stream upstream and downstream of particulate matter filter 26, respectively. Additionally, differential pressure sensors 42 and 44 may be arranged in the exhaust-gas stream on the upstream and downstream sides of particulate filter 26, respectively, for measuring the pressure drop across the particulate filter 26. The described sensors and their position are by way of example only and are not intended to limit the scope of the claimed invention.

A first port 46 is preferably arranged in the exhaust-gas stream upstream of first oxidation device 20. Similarly, a second port 48 is preferably arranged in the exhaust-gas stream upstream of second oxidation device 24. Ports 46, 48 are connected a duct or passage through which oxygen is selectively introduced into the exhaust-gas stream. The oxygen may be supplied, for example, from a reservoir on the vehicle or manufactured onboard the vehicle prior to delivery into the exhaust-gas stream. Alternatively, ports 46 and 48 may selectively introduce a controlled amount of air into the exhaust gas to increase the level of oxygen. The air may be supplied, for example, by an engine driven pump in communication with ports 46, 48. Additionally, one or more valves or throttles may be disposed between the air source and ports 46, 48 to selectively control the amount of air introduced into the exhaust-gas stream. However, the present invention is not intended to be limited to any particular oxygen source or to the hardware through which the oxygen is introduced into the exhaust-gas stream.

A first exhaust fuel injector 50 is also preferably disposed in the exhaust-gas stream upstream of first oxidation device 20. A second exhaust fuel injector 52 is preferably disposed between NOx abatement device 22 and second oxidation device 24. The exhaust fuel injectors 50 and 52 may be used to selectively introduce a controlled amount of "reactants" into the exhaust-gas stream. The term "reactants," as used herein include, but are not limited to, hydrocarbons (HC) such as raw diesel fuel, CO, $H_2$, urea, ammonia and other reducing agents. Fuel injectors 50 and 52 may be used in place of operating engine 10 under rich conditions or, alternatively, may supplement rich operation of engine 10. The present invention is not intended to be limited to any particular type of fuel injector or to the method used to supply controlled amounts of "reactants", such as HC and other reducing agents, into the exhaust-gas stream.

Engine 10 is controlled or regulated by electronic control unit (ECU) 16. In addition, ECU 16 communicates with the various sensors listed above, which cooperate to detect and analyze various operating parameters of the diesel engine 10 and conditions in after-treatment system 14. Integrated into ECU 16 is a computer or microprocessor and a memory that communicates therewith. Stored in this memory are, for example, characteristic maps for the lean or rich operation of engine 10, characteristic maps that define chemical composition of the exhaust gas and characteristic maps that define temperature of the exhaust gas. ECU 16 may be programmed to define the characteristic curves in accordance with which engine 10 and after-treatment system 14 are to be regulated during operation of the vehicle.

In order to regulate operation of engine 10 and after-treatment system 14, it is possible for ECU 16, on the one hand, to have recourse to signals or signal values, such as, for example, engine speed and accelerator pedal position. On the other hand, additional signals or signal values can be taken into account in order to regulate other aspects of operation. For example, temperature sensor 32 can be used to measure the exhaust-gas temperature upstream of $NO_X$ abatement device 22. The criterion for a changeover to rich operation of engine 10 or the controlled introduction of oxygen into the exhaust gas-stream can therefore be, for example, the maintenance of a specific regeneration temperature that must be present in $NO_X$ abatement device 22. However, temperature sensor 34 can also be used to establish a limiting temperature at which changing back to lean operation is required, since, for example, temperatures in the region of the thermal load limit of $NO_X$ abatement device 22 and of other engine components are reached. In addition, the exhaust gas temperature sensed by temperature sensor 32 may be used by ECU 16 to permit deliberate additional heating via exothermic reactions in first oxidation device 20, in order to bring the $NO_X$ abatement device 22 to an optimum operating temperature as quickly as possible.

With the aid of $NO_X$ sensors 30 and 36, which are arranged in the exhaust-gas stream upstream of first oxidation catalyst 20 and $NO_X$ abatement device 22, respectively, it is possible to determine the current level of $NO_X$ adsorption in $NO_X$ abatement device 22. $NO_X$ sensors 30 and 36 may also function as an air-to-fuel ratio sensor used to detect reducing agents (i.e., CO, HC and $H_2$) that emerge from $NO_X$ abatement device 22. For example, if the quantity of reducing agents present in the exhaust-gas stream downstream of $NO_X$ abatement device 22 exceed a predefined threshold value, this means, for rich operation, that $NO_X$ abatement device 22 has been completely regenerated or, for lean operation, that there is a functional fault in $NO_X$ abatement device 22. Alternatively, the air-fuel sensors could be separate from $NO_X$ sensors 30, 36. In addition to or as an alternative to using an air-fuel sensor, other reducing-agent sensors can be utilized including, but not limited to, a CO sensor and a lambda probe.

It will be appreciated by those skilled in the art that the present invention is not limited to any particular type or configuration of ECU 16, or to any specific control logic. What is essential to the present invention is that the various sensors communicate with some sort of control unit capable of adjusting the air-to-fuel ratio of the exhaust gas and controlling the level of oxygen in the exhaust gas. Moreover, it is essential that ECU 16 include some sort of control logic capable of adjusting the exhaust-gas temperature and oxygen level in response to one or more conditions of the exhaust gas, such as exhaust-gas temperature or exhaust-gas chemistry, at a predetermined point in the exhaust-gas stream.

The preferred embodiments of the present invention will now be described with reference to operation of the exemplary after-treatment system 14. In a first embodiment of the present invention, a method and arrangement for heating the exhaust gas is described. In an alternate embodiment of the present invention, a method and arrangement for removing pollutant emissions from the exhaust gas is described.

In a first embodiment of the present invention, oxidation devices 20, 24 are used, in concert with a selective and controlled introduction of oxygen into the exhaust gas, to increase the temperature of the exhaust gas. Following engine cold-start conditions, or other conditions where after-treatment system 14 is relatively cold, it is imperative that the after-treatment devices downstream of oxidation devices 20, 24 quickly reach their respective activation temperatures to begin removing undesirable emissions from the exhaust gas. To illustrate, if heating is required, ECU 16 may instruct first port 46, either alone or in concert with exhaust fuel injector 50, to introduce a controlled amount of oxygen and one or more reactants (i.e., HC, CO and $H_2$), respectively, into the exhaust-gas stream. The additional oxygen supplied by port 46 and the CO and HC emitted from engine 10, or possibly added by fuel injector 50, create an exothermic reaction in first oxidation element 20 that is controlled by ECU 16 regulating the amount of oxygen and reactants introduced into the exhaust-gas stream. The corresponding increase in the exhaust-gas temperature quickly raises the temperature of the downstream after-treatment devices, particularly $NO_X$ abatement device 22, to a temperature range that supports efficient operation.

The introduction of oxygen and reactants into the exhaust gas prior to first oxidation device 20 can be selectively controlled to provide a desired temperature in the exhaust-gas stream in response to the difference between a measured exhaust-gas temperature downstream of oxidation device 20 and a desired temperature. Simultaneously or alternatively, the introduction of oxygen and reactants can be selectively controlled in response to the chemical composition of the exhaust gas upstream or downstream of oxidation device 20. However, the method of selectively controlling the introduction of oxygen and reactants into the exhaust-gas stream is not limited to the control strategies described above. Alternatively, for example, the temperature and chemical composition of the exhaust gas is not measured at all. Instead, the introduction of oxygen and reactants is controlled in an open-loop fashion using predetermined characteristic maps to define temperature and chemical composition of the exhaust gas.

In the second stage of the exemplary after-treatment system 14, upon reaching the required activation temperature, $NO_X$ abatement device 22 stores the nitrogen oxides and oxides of sulfur contained in the exhaust gas exiting engine 10. The carbonaceous particulate matter in the exhaust gas passes through $NO_X$ abatement device 22 and second oxidation device 24 to the fourth stage where it is collected by particulate filter 26. The exhaust gas that exits after-treatment system 14 is therefore substantially free of nitrogen oxides, oxides of sulfur and carbonaceous particulate matter.

In the exemplary after-treatment system 14, switching from the $NO_X$ storage mode to the $NO_X$ reducing mode is preferably controlled by $NO_X$ sensor 36 positioned in the exhaust-gas stream downstream of $NO_X$ abatement device 22. $NO_X$ sensor 36 senses the $NO_X$ content of the exhaust-gas stream and delivers an electrical signal to ECU 16 indicative of the level of $NO_X$ being emitted from $NO_X$ abatement device 22. ECU 16 conditions the electrical signal and controls the air-to-fuel ratio and oxygen concentration in the exhaust gas to facilitate reduction of the stored emissions.

Determining the switch-over point between operation in the $NO_X$ storage mode and operation in the $NO_X$ reducing mode is not limited to measuring the amount of nitrogen oxides exiting $NO_X$ abatement device 22. An alternative to sensing the level of $NO_X$ exiting $NO_X$ abatement device 22 is to measure the exhaust-gas temperature as an indicator of engine speed and load, for example. $NO_X$ formation in diesel engines is a function of engine temperature, which generally increases as the combustion temperature increases. Thus, it can be inferred that $NO_X$ formation is taking place at a high rate when engine 10 is operating at a relatively high temperature. In yet another example, the switch-over point between the $NO_X$ storage mode and the $NO_X$ reducing mode may be defined by characteristic maps or model-based control algorithms operating within ECU 16.

During the nitrate and sulfate regeneration cycles of $NO_X$ abatement device 22, the level of reductants in the exhaust gas is significantly increased to facilitate regeneration. Additionally, ECU 16 may instruct first port 46 to inject a controlled amount of oxygen into the exhaust-gas stream to raise the temperature of the exhaust gas exiting first oxidizing device 20, as described above in the first embodiment. The temperature of the exhaust gas existing first oxidation device 20 is precisely controlled by the amount of oxygen introduced into the exhaust-gas stream under the direction of ECU 16, until the requisite temperatures are achieved for $NO_X$ reduction and sulfur release. While the range of temperatures needed to achieve $NO_X$ reduction and sulfur release depend on the type of $NO_X$ abatement device 22 employed in after-treatment system 14, these temperatures are typically in the range of approximately 150–400° C. and 450–700° C., respectively, for $NO_X$ adsorber catalysts.

In another embodiment of the present invention, a method and arrangement for oxidizing pollutant emissions, particularly pollutant emissions exiting $NO_X$ abatement device 22 during $NO_X$ reduction and sulfur release, is described. As noted above, operating engine 10 under rich air-fuel conditions results in a very low concentration of oxygen in the exhaust gas. Thus, incomplete oxidation of pollutant emissions, such as CO, HC, $NH_3$ and $H_2S$, will occur within second oxidation device 24 without a sufficient influx of oxygen. To facilitate the oxidation of CO, HC, $NH_3$ and $H_2S$ emitted from $NO_X$ abatement device 22, ECU 16 selectively instructs second port 48 to introduce a controlled amount of oxygen into the exhaust-gas stream upstream of second oxidation device 24. This introduction of oxygen ensures that sufficient oxygen will be available in the exhaust gas to oxidize CO, HC, $NH_3$ and $H_2S$ in second oxidation device 24 during the nitrate and sulfate regeneration cycles of $NO_X$ abatement device 22.

The selective introduction of oxygen into the exhaust gas upstream of second oxidation device 24 can be precisely controlled to provide a desired exhaust-gas temperature in response to the difference between a measured exhaust gas temperature downstream of the second oxidation device 24 and a desired temperature. Simultaneously or alternatively, the introduction of oxygen can be selectively controlled in response to the chemical composition of the exhaust gas upstream or downstream of second oxidation device 24. As described in the first embodiment, the method of selectively controlling the introduction of oxygen is not limited to the control strategies described above. Alternatively, for example, the temperature and chemical composition of the exhaust gas is not measured at all. Instead, the introduction of oxygen is controlled in an open-loop fashion using predetermined characteristic maps to define temperature and chemical composition of the exhaust gas.

Switching from the particulate matter storage mode to the regeneration mode is preferably controlled by pressure sensors 42, 44 arranged in the exhaust-gas stream on either side of particulate filter 26. Pressure sensors 42, 44 deliver an electrical signal to ECU 16, which conditions the electrical signal and controls the air-to-fuel ratio of the exhaust gas as well as the introduction of oxygen into the exhaust-gas stream via ports 46, 48.

When a pressure drop through particulate filter 26 is sensed that is greater than a predetermined threshold stored in the memory of ECU 16, the ECU 16 controls the air-fuel ratio of the exhaust gas such that a significant amount of reactants are present in the exhaust-gas stream. Additionally, ECU 16 instructs port 48 to selectively introduce a controlled amount of oxygen into the exhaust-gas stream. The introduction of oxygen and the air-to-fuel ratio upstream of second oxidation device 24 can be precisely controlled using the control strategies described above.

Provided the activation temperature of second oxidation device 24 is achieved, the reactants are decomposed (oxidized) in second oxidation device 24. The exothermic reaction that proceeds in second oxidation device 24 heats the exhaust gas and particulate filter 26 to a temperature range that facilitates rapid combustion of the stored particulate matter. While the range of temperatures needed to combust the stored particulate matter depend on the type of particulate filter 26 employed in after-treatment system 14, these temperatures are typically in the range of approximately 450–650° C.

With respect to the exemplary after-treatment system 14, the present invention is particularly useful for switching from the $NO_X$ storage mode and particulate matter storage mode to their respective regeneration modes virtually simultaneously. As noted above, a typical sulfate regeneration cycle requires that the exhaust gas contain a relatively high concentration of reductants, a relatively low concentration of oxygen and a relatively high exhaust-gas temperature similar to the temperature needed to combust the carbonaceous particulate matter and HC stored in particulate filter 26. However, the oxygen concentration in the exhaust-gas is generally too low for regeneration of particulate filter 26.

Accordingly, ECU 16 may instruct second port 48 to introduce a controlled amount of oxygen into the exhaust-gas stream causing second oxidation device 24 to oxidize substantially all of the CO, HC, $NH_3$ and $H_2S$ emitted from $NO_X$ abatement device 22 during a sulfate regeneration cycle. The additional oxygen in the exhaust-gas stream is also used by particulate filter 26 to facilitate combustion of the stored particulate matter. The introduction of oxygen into the exhaust gas stream prior to second oxidation device 24 can be precisely controlled using the control strategies described above.

The exemplary after-treatment system 14 was presented to show the novel and useful aspects of the present invention, but was not intended to limit the scope of the present invention. Thus, other after-treatment system configurations, which include after-treatment devices that require supplemental heating of the exhaust gas to achieve and sustain an activation or regeneration temperature, are within the scope of this invention. Moreover, other after-treatment systems, that include after-treatment devices that require supplemental oxygen to facilitate removal of undesirable pollutant emissions from the exhaust gas, are also within the scope of this invention.

Among other advantages, the present invention facilitates the removal of undesirable pollutant emissions, such as HC, CO, $NO_X$, $NH_3$, $SO_2$, $SO_3$ and $H_2S$, from the exhaust gas of an internal combustion engine by increasing and sustaining the operation temperature of various after-treatment devices. After-treatment devices suitable for use with the inventive after-treatment system arrangement and method of heating the exhaust gas include, but are not limited to, oxidation catalysts, three-way catalysts, NOx catalysts, NOx adsorber catalysts, NOx catalysts employing selective catalytic reduction with urea or ammonia, NOx catalysts assisted by non-thermal plasmas, diesel particulate filters, catalyzed diesel particulate filters, sulfur traps and other after-treatment devices that require supplemental heating to achieve and sustain an activation or regeneration temperature. The present invention also facilitates the oxidation of undesirable pollutant emissions in the exhaust gas, such as HC, partially oxidized HC, CO, $NH_3$ and $H_2S$, into more desirable emissions such as $CO_2$ and $H_2O$.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A method of heating the exhaust gas of an internal combustion engine comprising the steps of:
   determining a first temperature of the exhaust gas at a point downstream of a first oxidation device;
   maintaining the air-to-fuel ratio entering the engine;
   selectively increasing the level of oxygen and the level of a reactant in the exhaust gas by introduction of oxygen and the reactant into the exhaust gas before it enters the first oxidation device in response to the first temperature of the exhaust gas;
   catalytically oxidizing the exhaust gas, wherein the catalytic oxidation of the reactant introduced into the exhaust gas raises the temperature of the exhaust gas; and
   introducing the exhaust gas after the first oxidation device into a $NO_x$ abatement device.

2. The method of claim 1 further including selectively increasing the level of reactants in the exhaust gas in response to the condition of the exhaust gas prior to catalytically oxidizing the exhaust gas.

3. The method of claim 2, wherein the reactant comprises carbon monoxide.

4. The method of claim 1, wherein the selectively increasing of the level of oxygen in the exhaust gas is further defined by selectively injecting a controlled amount of oxygen into the exhaust gas.

5. The method of claim 1, wherein the selectively increasing of the level of oxygen in the exhaust gas is further defined by selectively injecting a controlled amount of air into the exhaust gas.

6. The method of claim 1, wherein the determining of the temperature of the exhaust gas comprises determining the temperature of the exhaust gas subsequent to catalytically oxidizing the exhaust gas.

7. The method of claim 6, wherein determining the temperature of the exhaust gas comprises sensing the exhaust gas temperature and, wherein the increasing step comprises selectively increasing the level of oxygen to provide a desired temperature.

8. The method of claim 6, wherein the temperature of the exhaust gas is determined by a characteristic map and, wherein the increasing comprises selectively increasing the level of oxygen to provide a desired temperature.

9. An after-treatment system arrangement for heating the exhaust gas of an internal combustion engine comprising:
   an oxidation device for catalytically oxidizing the exhaust gas;
   a $NO_x$ abatement device connected downstream of the oxidation device;
   an oxygen source;
   a source of reactants; and
   a first port upstream of the oxidation device for selectively introducing a controlled amount of oxygen and a second port upstream of the oxidation device for selectively introducing a controlled amount of reactants into the exhaust gas in response to the temperature of the exhaust gas as determined at a point downstream of the oxidation device.

10. The arrangement of claim 9, wherein the reactants comprise at least carbon monoxide.

11. The arrangement of claim 9, wherein the second port selectively injects a controlled amount of reactants to supplement the reactants introduced into the exhaust gas by operating the engine rich.

12. The arrangement of claim 9, wherein the oxygen is contained in air.

13. The arrangement of claim 12, wherein the first port is configured to selectively introduce a controlled amount of air into the exhaust-gas.

14. The arrangement of claim 9, further including at least one sensor, wherein the temperature of the exhaust gas is measured by the sensor and the first port is operated to increase the level of oxygen in the exhaust to provide a desired temperature.

15. The arrangement of claim 9, further including a control unit, wherein the temperature of the exhaust gas is determined by a characteristic map in the control unit and the first port is operated to increase the level of oxygen in the exhaust to provide a desired temperature.

16. A method of reducing emissions in the exhaust-gas of a diesel engine, comprising:
   (a) when the air-to-fuel ratio of the exhaust gas is lean in fuel,
      catalytically oxidizing in a first oxidation device the exhaust gas from the engine, selectively increasing the level of oxygen and the level of reactants in the exhaust gas by introduction of oxygen and reactants into the exhaust gas before it enters the first oxidation device in response to a first temperature of the exhaust gas measured downstream of the first oxidation device, wherein the catalytic oxidation of the reactants introduced into the exhaust gas raises the temperature of the exhaust gas exiting the first oxidation device;
      removing nitrogen oxides from the exhaust gas in a $NO_x$ abatement device; and
      collecting particulate matter contained in the exhaust gas in a particulate filter; and
   (b) periodically regenerating one or both of the $NO_x$ abatement device and the particulate matter filter by intentionally shifting the air-to-fuel ratio of the exhaust to a fuel rich air-to-fuel ratio and
      selectively introducing a controlled amount of oxygen into the exhaust gas prior to a second oxidation device downstream of the $NO_x$ abatement device to facilitate heating of the exhaust gas to a temperature that promotes combustion of the collected particulate matter.

17. The method of claim 16, wherein the regenerating of the adsorbent and particulate filter occur nearly simultaneously.

18. The method of claim 16, wherein the regenerating of the particulate filter is further defined by introducing a controlled amount of air into the exhaust gas sufficient to promote the rapid combustion of the collected particulate matter.

19. The method of claim 16, wherein the removing of nitrogen oxides from the exhaust gas is further defined by catalytically reducing nitrogen oxides to nitrogen and water by selective catalytic reduction when the air-to-fuel ratio of the exhaust gas is lean in fuel.

20. The method of claim 19, wherein the catalytically reducing of nitrogen oxides is further defined by selectively introducing at least one of hydrocarbons, urea and ammonia into the exhaust gas prior to catalytically reducing the nitrogen oxides.

21. The method of claim 16, wherein the removing of nitrogen oxides from the exhaust gas is further defined by adsorbing the nitrogen oxides in an adsorbent when the air-to-fuel ratio of the exhaust gas is lean in fuel.

22. The method of claim 21 further including periodically regenerating the adsorbent by intentionally shifting the air-to-fuel ratio of the exhaust gas to a fuel rich air-to-fuel ratio and selectively introducing a controlled amount of oxygen into the exhaust gas to facilitate heating of the exhaust gas to a temperature range that supports the release of the nitrogen oxides from the adsorbent.

23. The method of claim 22, wherein the regenerating of the adsorbent is further defined by introducing a controlled amount of oxygen into the exhaust gas downstream of the adsorbent to oxidize substantially all of the hydrocarbons and carbon monoxide remaining in the exhaust gas.

24. The method of claim 22, wherein the regenerating of the adsorbent is further defined by introducing a controlled amount of oxygen into the exhaust gas downstream of the adsorbent to oxidize ammonia and hydrogen sulfide in the exhaust gas.

25. The method of claim 22, wherein the regenerating of the adsorbent is further defined by sensing at least the level of nitrogen oxides in the exhaust gas and switching the air-to-fuel ratio of the exhaust gas from being lean in fuel to being rich in fuel when the level of nitrogen oxides in the exhaust gas exceeds a threshold value.

26. The method of claim 22, wherein the regenerating of the adsorbent is further defined by switching the air-to-fuel ratio of the exhaust gas from being lean in fuel to being rich in fuel as determined by characteristic maps.

27. The method of claim 22, wherein the catalytically oxidizing of the exhaust gas from the engine comprises oxidizing at least one of hydrogen, hydrocarbons and carbon monoxide in the exhaust gas.

28. The method of claim 27, wherein the regenerating of the adsorbent is further defined by controlling the amount of oxygen introduced into the exhaust gas such that a portion of the hydrogen, hydrocarbons and carbon monoxide in the exhaust gas remain unoxidized.

29. The method of claim 28, wherein the regenerating of the adsorbent is further defined by passing the hydrogen, hydrocarbon and carbon monoxide rich exhaust gas through the adsorbent where a reaction occurs between at least a portion of the hydrogen, hydrocarbons and carbon monoxide and the stored nitrogen oxides.

* * * * *